Oct. 6, 1964     B. H. KRYZER     3,152,077
FILTERS
Filed Feb. 21, 1962
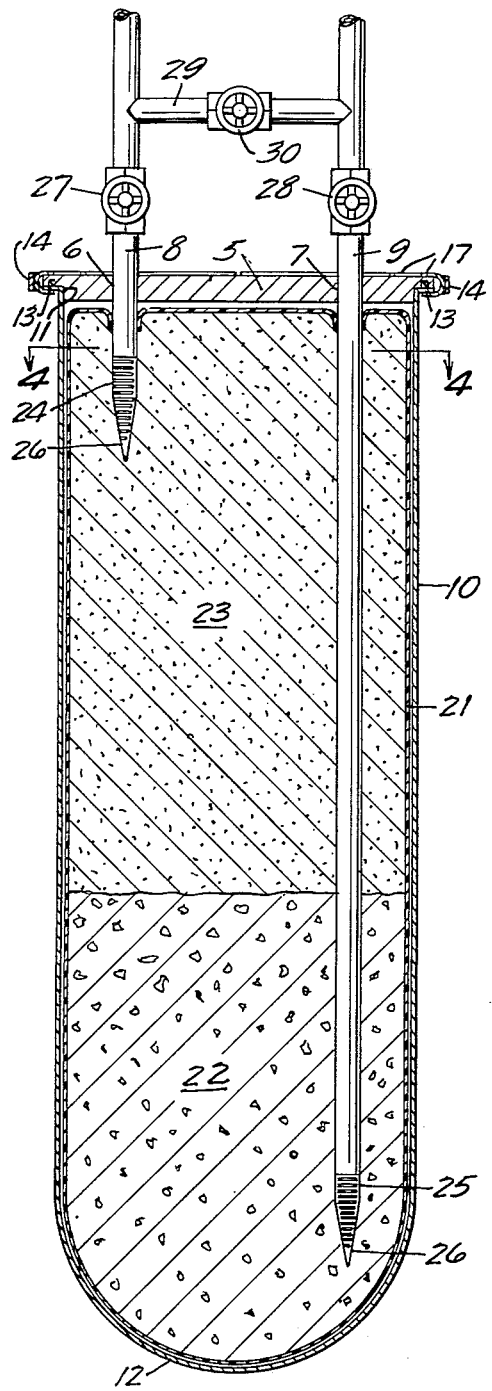
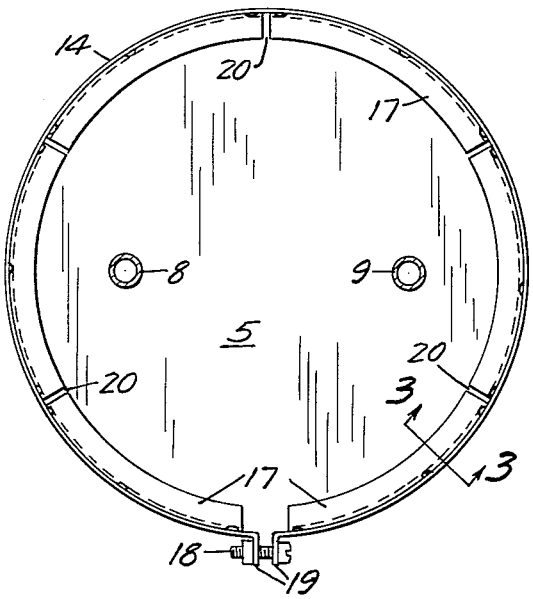
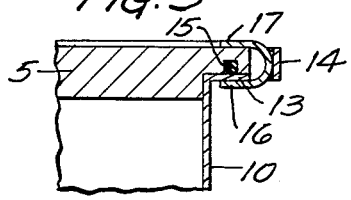
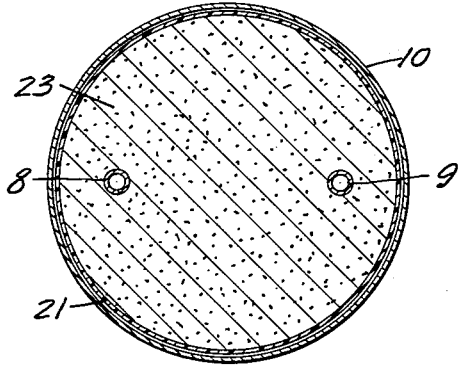
INVENTOR
BENJAMIN H. KRYZER
BY John E. Kryzer
ATTORNEY

United States Patent Office 3,152,077
Patented Oct. 6, 1964

3,152,077
FILTERS
Benjamin H. Kryzer, St. Paul, Minn., assignor to Union Tank Car Company, Chicago, Ill., a corporation of New Jersey
Filed Feb. 21, 1962, Ser. No. 174,857
1 Claim. (Cl. 210—233)

This invention relates to improvements in filters of the type containing a mass of particulate filter material, and has for its principal object to provide a filter having a two part casing wherein a mass of particulate filter material is contained in a fluid-impervious bag adapted to be punctured to receive inlet and outlet connections when the parts of the casing are assembled, the bag of filter material being readily removable from the casing and readily replaceable by another sealed bag containing a fresh mass of particulate filter material.

The invention also includes certain novel features of construction which reduce the cost of the filter and facilitate the periodical replacement of fouled particulate filter material with fresh material contained in a sealed low cost bag.

Referring to the accompanying drawing:

FIGURE 1 is a part central vertical sectional view and part elevational view showing one of my improved filters including a preferred arrangement of inlet and outlet conduits and flow control valves;

FIG. 2 is a plan view of the filter on a larger scale;

FIG. 3 is a fragmentary vertical sectional view taken on the line 3—3 of FIG. 2, and FIG. 4 is a horizontal sectional view taken on the line 4—4 of FIG. 1.

As shown in FIG. 1, my improved filter has a head plate 5 which is formed with spaced openings 6 and 7 adapted to receive an inlet conduit 8 and an outlet conduit 9 respectively. These conduits are rigidly secured to the head plate 5 in sealing relation thereto and extend substantially at right angles from the plate into the filter casing. The body of the filter has a tubular casing member 10 having an open end 11 and a closed end 12. An annular flange 13 projects outwardly from the open end of the casing member 10 and is adapted to be detachably secured to the head plate 5 by a clamp ring indicated generally at 14. An annular sealing gasket 15 is confined in a groove in the head plate 5 and is adapted to be held under compression by the ring 14 and a series of arcuate members of U shape in cross section having flanges 16 and 17 adapted to engage the lower side of the flange 13 and upper side of the plate 5 respectively. The arcuate members may be spot welded or otherwise secured to the ring 14. Clamping and sealing force may be applied by means of a clamp screw 18 and nut (FIG. 2) engaging radially projecting end portions 19 of the ring 14. Sufficient flexibility to allow the clamp ring to be sprung to and from clamping engagement with the plate 5 and casing member 10 may be imparted by providing radial slots 20 at suitable intervals along the flanges 16 and 17.

Fitting loosely within the tubular casing member 10 is a fluid-impervious bag 21 preferably containing masses 22 and 23 of finely divided readily separable particles of suitable filter material. The bag 21 is formed from an inexpensive synthetic resin material, e.g., thin flexible polyethylene sheet material. This bag is formed to fit within the casing member 10, and after being filled with the body or bodies of particulate material may be closed and heat sealed for storage until placed in the filter casing, as hereinafter described. Distributor heads 24 and 25 are provided on the inner ends of the inlet and outlet conduits 8 and 9 respectively for flow of fluid to and from the body of filter material at selected elevations therein.

As indicated in FIG. 1, the heads 24 and 25 have openings in the form of narrow slots for flow to and from the filter body and each of these distributors has a sharp the filter body and each of these distributors has a sharp pointed inner end 26 adapted to readily puncture the bag 21 when the parts of the filter casing are assembled with the bag of filter material therein. As shown, the distributor 24 for the inlet conduit 8 may be disposed near the upper or open end of the tubular casing member 10 and the distributor 25 near the closed end of the casing member. Thus the normal flow through the masses 22 and 23 of filter material is from the distributor 24 through the mass 23, then through the mass 22 and distributor 25, to the outlet conduit 9.

Suitable controls for flow of fluid through the filter, as shown in FIG. 1, include a valve 27 interposed in the conduit 8 and a valve 28 in the conduit 9. Also, as shown somewhat schematically in FIG. 1, a by-pass conduit 29 may be provided to connect the conduit 8 to the conduit 9 above the valves 27 and 28, and a normally closed valve 30 is interposed in the by-pass conduit 29 to be opened when the valves 27 and 28 are closed for the replacement of the filter material. In a typical installation raw water under pressure is supplied to the conduit 8 upstream from the valve 27 and the filtered water is discharged through the conduit 9 to the service outlets. The filter mass 22 may comprise finely divided activated carbon and the overlying mass 23 may comprise fine sand or other suitable natural or artificial aggregate.

The material forming the bag 21 should be sufficiently tough and elastic to remain in peripheral contact with the inlet and outlet conduits 8 and 9 near the head plate 5 when the filter is in use.

My improved filter is particularly adapted for domestic use where the available water is turbid or contains undesirable impurities that may be removed by filtering treatment. Periodically, when the filter material in a bag 21 becomes fouled to the point where replacement is desirable, a bag of fresh material may be substituted quickly and easily in the casing member 10. Thus the clamp ring 14 may be removed after closing the valves 27 and 28 to separate the tubular casing member 10 from the head plate 5. The bag containing the exhausted or fouled filter material is thereupon removed from the distributors 24 and 25 and casing member 10, a fresh bag of filter material is placed in the casing member 10, the pointed ends 26 of the distributors 24 and 25 are thrust through the upper side of the fresh bag to the operative position shown. Finally, the clamping ring 24 is replaced to fasten the casing member 10 in sealed relation to the head plate 5, and the valves 27 and 28 are opened to place the filter in operation.

I claim:

A device for treating liquid under pressure comprising:
(A) a rigid hollow casing having an open end and a closed end, a removable lid closing said open end,
(B) a liquid treating solid particulate material,
(C) a bag made of thin, tough, flexible, non-metallic liquid impervious sheet material completely enclosing said liquid treating material, said particulate material completely filling said bag, said bag and enclosed material being housed in and substantially completely filling said casing,
(D) inlet and outlet liquid conduits for conveying pressurized liquid, said conduits passing through said lid and into said casing and having pointed ends inserted into said bag through holes punctured in said sheet material by said ends,
(E) one of said conduits being substantially longer than the other for causing said liquid to flow through a substantial portion of said treating material,
(F) means holding said inlet and outlet conduits immovable with respect to said casing during treatment of said liquid, and (G) said sheet material around said holes remaining in peripheral sealing contact with portions of said conduits inside said bag so as to prevent escape of said solid particulate material from said bag during pressurized treatment of said liquid.

References Cited in the file of this patent

UNITED STATES PATENTS

| | | |
|---|---|---|
| 1,742,919 | Manning | Jan. 7, 1930 |
| 1,937,943 | Brown | Dec. 5, 1933 |
| 1,941,982 | Gill | Jan. 2, 1934 |
| 2,014,445 | Miller | Sept. 17, 1935 |
| 2,063,086 | Fitz Gerald | Dec. 8, 1936 |
| 2,101,014 | Angelus et al. | Nov. 30, 1937 |
| 2,117,091 | Gudmundsen | May 10, 1938 |
| 2,128,589 | Manning | Aug. 30, 1938 |
| 2,203,668 | Burckhalter | June 11, 1940 |
| 2,304,453 | Gudmundsen | Dec. 8, 1942 |
| 2,337,469 | Hill | Dec. 21, 1943 |
| 2,398,830 | Hamilton | Apr. 23, 1946 |
| 2,605,901 | Morrison et al. | Aug. 5, 1952 |
| 2,630,919 | Tyler | Mar. 10, 1953 |
| 2,789,654 | Zurit | Apr. 23, 1957 |
| 2,851,164 | Morino | Sept. 9, 1958 |
| 2,867,328 | Sorensen | Jan. 6, 1959 |
| 2,939,381 | McBride | June 7, 1960 |
| 2,986,142 | Bieberdorf et al. | May 30, 1961 |
| 2,987,187 | Comroe | June 6, 1961 |

FOREIGN PATENTS

| | | |
|---|---|---|
| 215,775 | Australia | July 1, 1958 |
| 590,618 | Great Britain | July 23, 1947 |